May 22, 1928. 1,670,994
J. G. SNYDER ET AL
TIE AND FASTENER
Filed June 9, 1927 2 Sheets-Sheet 1
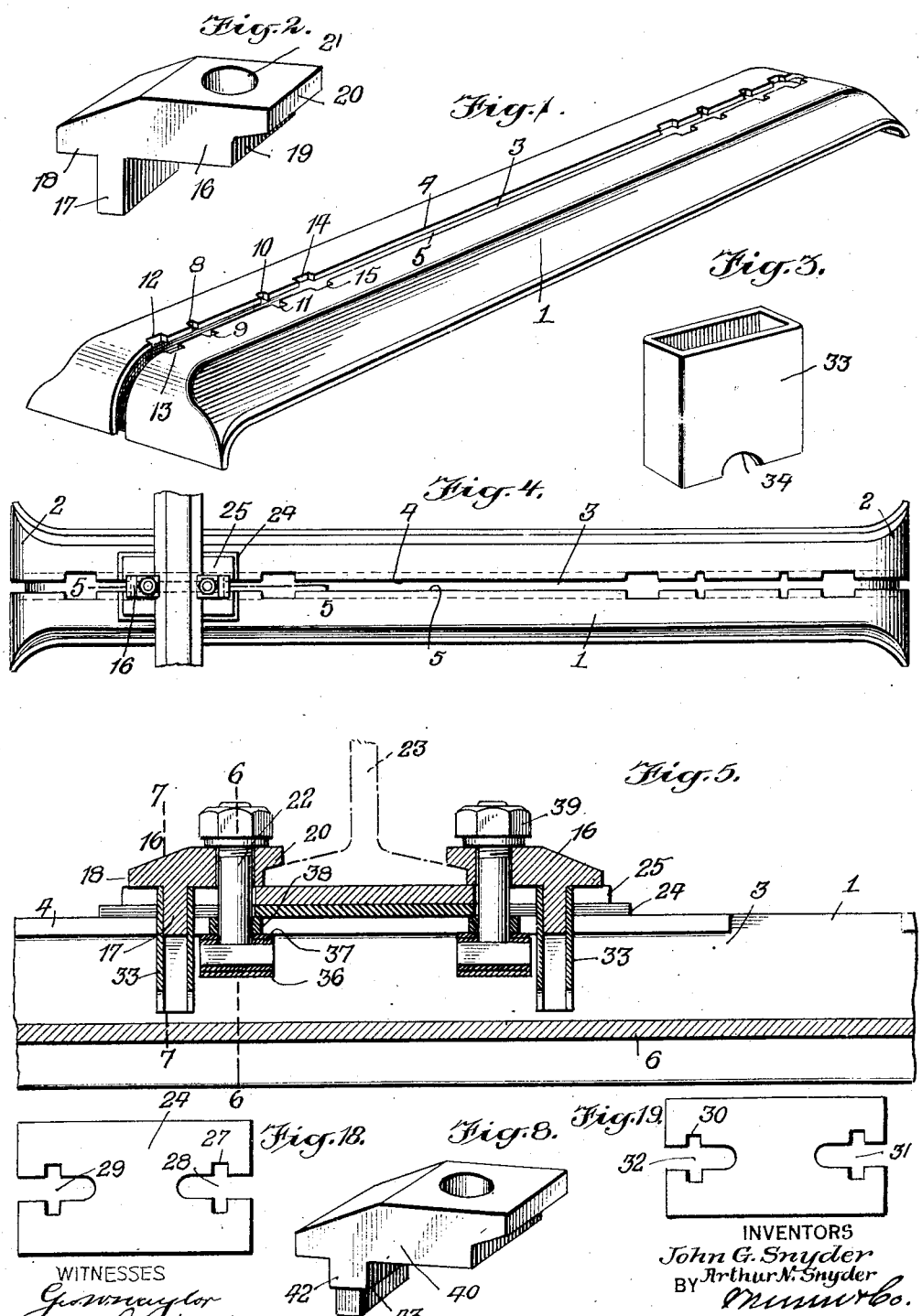
INVENTORS
John G. Snyder
Arthur N. Snyder
BY
ATTORNEY
WITNESSES May 22, 1928.                                                                  1,670,994
J. G. SNYDER ET AL
TIE AND FASTENER
Filed June 9, 1927                              2 Sheets-Sheet 2
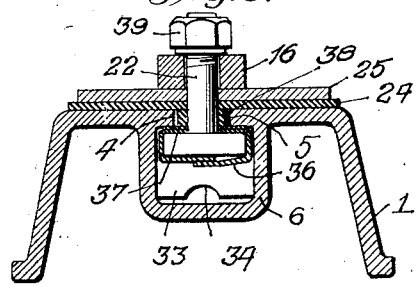
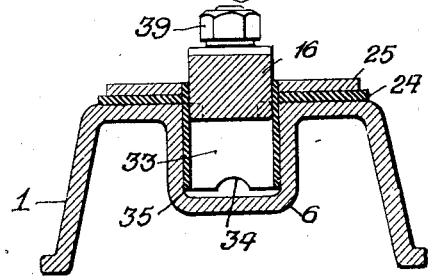
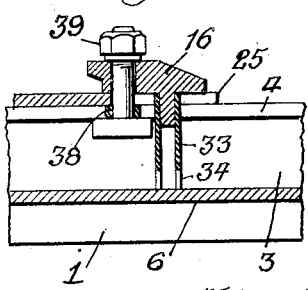
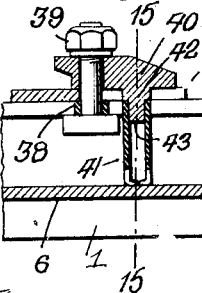
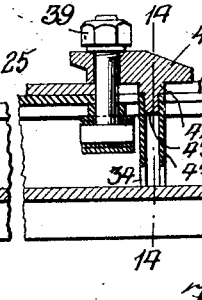
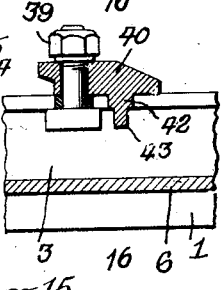
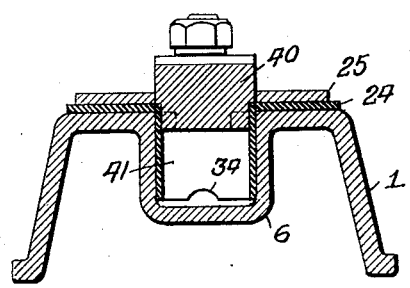
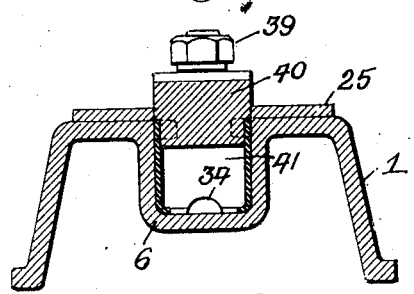
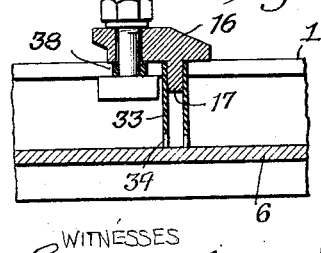
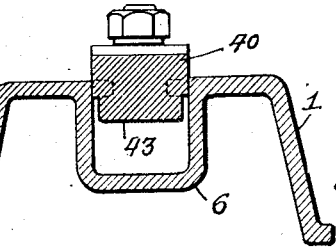
INVENTORS
John G. Snyder
Arthur N. Snyder
BY Munn & Co.
ATTORNEY
WITNESSES
Geo. N. Naylor
A. L. Kitchin Patented May 22, 1928.

1,670,994

UNITED STATES PATENT OFFICE.

JOHN G. SNYDER AND ARTHUR N. SNYDER, OF NEW YORK, N. Y.

TIE AND FASTENER.

Application filed June 9, 1927. Serial No. 197,700.

This invention relates to railroad ties and rail fasteners therefor, and has for an object to provide an improved construction wherein a simplified device is presented which may be insulated or may be left uninsulated or may be reinforced or unreinforced while always presenting a maximum clamping action.

Another object of the invention is to provide a tie and rail fastener therefor, wherein the parts of the fastener are so related and so constructed that a single set of parts may be differently adjusted to provide insulation or non-insulation, reinforcement or non-reinforcement, while causing the same clips to be utilized for producing the desired bracing and clamping action.

A further object of the invention is to provide in a rail tie and fastener an improved simplified insulating structure for insulating the rail from the tie while permitting a firm clamping action.

An additional object is to provide an improved clip for tie fasteners wherein the same may be used in different ways and always effect a maximum gripping action, the clip being capable in its use of clamping the rail in place with reinforcement and insulation, with reinforcement and without insulation and also without either reinforcement or insulation.

In the accompanying drawings—

Figure 1 is a perspective view of a tie disclosing certain features of the invention.

Figure 2 is a perspective view on a large scale, of a clip used in connection with the tie shown in Figure 1.

Figure 3 is a perspective view on a large scale of an insulating member designed to be used in connection with the rail shown in Figure 1.

Figure 4 is a top plan view on a reduced scale, of the tie shown in Figure 1, a rail and fastening structure being shown in connection therewith.

Figure 5 is a large sectional view through Figure 4, substantially on line 5—5.

Figure 6 is a transverse sectional view through Figure 5 on line 6—6.

Figure 7 is a sectional view through Figure 5 on line 7—7.

Figure 8 is a perspective view of a slightly different form of clip from that shown in Figure 2.

Figure 9 is a fragmentary longitudinal sectional view through a tie similar to that shown in Figure 1 but with the clip shown in Figure 2 acting without the insulating plate.

Figure 10 is a view similar to Figure 9 but showing the fastener without the reinforcing plate.

Figure 11 is a detail longitudinal sectional view similar to one-half of the view shown in Figure 5 but illustrating the parts in connection with the modified form of clip shown in Figure 8.

Figure 12 is a view similar to Figure 11 but showing the insulating plate removed.

Figure 13 is a view similar to Figure 12 but showing the reinforcing plate removed.

Figure 14 is a sectional view similar to Figure 7 but showing the modified clip illustrated in Figure 8, the same being taken through Figure 11 on line 14—14.

Figure 15 is a view similar to Figure 14 but showing the parts connected together with the use of the insulating plate, said view being taken through Figure 12 on line 15—15.

Figure 16 is a view similar to Figure 15 but with the reinforcing plate removed, said view being a section through Figure 13 on line 16—16.

Figure 17 is a perspective view of the bolt and insulating means mounted thereon, shown in Figure 6.

Figure 18 is a top plan view of an insulating plate, disclosing certain features of the invention.

Figure 19 is a top plan view of a reinforcing plate disclosing certain features of the invention.

Referring to the accompanying drawings by numerals, 1 indicates the body of a metal tie, said body being preferably provided with closed ends 2, though this is not essential. This tie is preferably rolled from a single piece of metal, as for instance, copper bearing steel and in the rolling, the same is provided with a groove 3 having overhanging flanges or shoulders 4 and 5 integral with the remaining part of the tie. By reason of the formation of the groove 3, there is provided a depending trough member 6 as shown in Figure 6, said trough member acting in a certain sense as a bracing web or bead on the under surface of the top of the rail for bracing the parts. Adjacent each end of the body 1 there are provided notches 8, 9, 10 and 11 for receiving suitable clips hereinafter fully described.

Also adjacent these notches are auxiliary notches 12, 13, 14 and 15. These auxiliary notches are provided in order to present suitable openings through which the heads of clamping bolts hereinafter described may be readily inserted and moved along the groove 3 with the heads of the bolts under the shoulders or flanges 4 and 5. The notches 8 and 9 are preferably opposite each other, though they might be offset if desired and the same is true of the notches 10 and 11. Where the notches are opposite to each other, clips 16 as shown in Figure 2 may be used and the web or tongue 17 caused to fit properly in the respective notches and be braced so as to withstand any strain put thereon.

As indicated in Figure 2, clip 16 is provided with a rearwardly extending apron 18 which is not absolutely essential but is desirable as it assists in taking up certain of the strain. At the opposite end to the extension or apron 18, the clip 16 is provided with a notch 19 provided by reason of the clamping extension 20 which is designed to fit over part of the base of a rail as shown in Figure 5. An aperture 21 extends through clip 16 and accommodates a suitable bolt 22, said aperture being near the notch 19 whereby the head of the bolt 22 underlaps somewhat the base of the rail as shown in Figure 5. This will provide an exceedingly strong arrangement. The clip 16 is adapted to be used on either side of the rail 23 adjacent either end of the tie so that a description of one clip, one bolt 22 and one set of insulation will apply equally to the other similar members as the parts are identical.

When the tie is to be used in a track where there is a block signalling system in operation, the rail 23 must be insulated and, consequently, the parts are arranged as shown in Figures 5, 6 and 7. From these figures it will be noted that there is provided an insulating plate 24 which rests on the top of the body 1 and supports a reinforcing plate of metal 25. Plate 24 may be a good grade of fiber or other insulation and is made sufficiently strong to withstand any weight which may be brought to bear thereon. This plate of insulation is illustrated in plan in Figure 18. From this figure it will be noted that the plate 24 is provided with a number of notches 27 registering with the notches 8, 9, 10 and 11. Longitudinal notches 28 and 29 are also provided merging into the other notches, said longitudinal notches accommodating the bolt 22. The reinforcing plate 25 may be of any desired thickness and is preferably slightly less in size than the insulating plate 24 as indicated in Figures 5, 6 and 7. This plate is provided with notches 30 registering exactly with notches 8, 9, 10 and 11. The notches 30 merge into longitudinal notches 31 and 32 which register with the longitudinal notches 28 and 29 so as to permit bolt 22 to be properly positioned.

In order to permit the clip 16 to properly function without shortcircuiting the parts, a rectangular tubular insulating member 33 is provided, which at the lower end, is formed with suitable notches 34 to permit drainage. This insulating tube is made of fiber or other desired material and rests lightly on the curved edge 35 of member 6 as shown in Figure 7. The insulating tube 33 fits snugly into the respective notches 8 and 9 or 10 and 11 and extends through the notches 27 in plate 24 and notches 30 in plate 25 as illustrated particularly in Figure 7. The clip 16 may then be placed in position with the flange or web 17 snugly fitting into the insulating sleeve or tubular member 33. The bolt 22 is provided with an insulating wrapping 36 as shown in Figure 17 and on top of this insulating wrapping is a plate 37 of insulating material and on top of this a tubular insulating sleeve 38. The sleeve 38 is adapted to fit into the space between the shoulders or flanges 4 and 5 as shown in Figure 6 while the plate 37 presses against the under surface of flanges 4 and 5. The insulating wrapping 36 forms auxiliary insulating means against the flanges 4 and 5 and also prevents any shortcircuiting with the trough-shaped member or bead 6 in case the head of the bolt turns slightly and presses against the side walls of member 6.

When it is desired to assemble the parts into an operative position as shown in Figure 5, the rail 23 is raised slightly if the same is in place and the insulating plate 24 positioned as shown in Figure 5. The reinforcing plate 25 is then placed in position on top of plate 24 and then the bolts 22 with the insulation mounted thereon as shown in Figure 17, are forced downwardly through the various notches 12 to 15 inclusive and then slid over into the position shown in Figure 5. The insulating tubular members or sleeves 33 are then forced downwardly into substantially the position shown in Figure 7, after which, the clips 16 are placed in position over the bolts 22 and finally the nuts 39 of these bolts are tightened. By this construction and arrangement, the base of the rail 23 is firmly clamped in place and also the plates 24 and 25 are clamped in place. It will be noted that the bolts 22 are the only means for holding the clips and other parts in operative position and, consequently, these bolts may be removed at any time for renewing the insulation 24, renewing any of the other parts or when it is desired to remove the entire tie.

Under some circumstances, as for instance, in yards and places where they do not have block signalling systems, the insulating plate 24 is not necessary. When this is the case, this plate is merely left off and the parts are assembled as above described. When the parts are assembled and the nuts 39 tightened, the parts will assume the position shown in Figure 9. It will be noted from this figure that the insulating sleeve 33 is left in place as well as the insulating ring 38. These members are not left in place for the purpose of insulation but merely as washers or liners to fill in the space whereby there will be no loose motion between the bolt and shoulders 4 and 5 or between the flange 17 of clip 16 and the plate 25 and flanges 4 and 5. Under some circumstances, the reinforcing plate 25 may not be wanted and when this is the case, the plate 25 is merely omitted when the parts are assembled as above described and the result will be as shown in Figure 10. As the insulation 33 extends upwardly a short distance above the top of body 1, the lower edge of the insulation 33 is crushed downwardly and bent inwardly somewhat as shown in Figure 15 as the clip 16 is forced to its position against the top of the body 1.

As indicated in Figure 9, the insulating members 33 and 38 are used merely as washers and not for insulating purposes. It is, of course, evident that if desired, these could be eliminated and ordinary metal fillers could be used. From the above described re-arrangement of parts, it will be seen that the same clip 16 may be used when the parts are insulated and reinforced, may be used when the parts are reinforced without insulation or may be used without either reinforcement or insulation.

Figures 8 and 12 to 16 inclusive, show a modified construction, said modification being principally in the construction of the clip 40. The insulating sleeve 41 is also slightly different from the sleeve 33 in that it is slightly shorter and does not extend through the plate 25, which plate is identical with the plate shown in Figure 5. The insulating plate 24 is also identical with the plate 24 shown in Figure 5. In forming the clip 40, the same is constructed identically with clip 16 except for the depending bracing web 42 which is made of a size to snugly fit in the respective notches 8 to 11 inclusive, the notches 29 or the notches 30. Depending from the web 42 is an auxiliary web 43 which is the same dimension as web 17 except that it does not extend downwardly as far but the combined length of this web and web 42 is substantially the same as web 17. When the clip 40 is to be used and the parts are to be insulated, the arrangement shown in Figure 11 is used which is identical with the structure shown in Figure 5 except that the insulating sleeve 41 extends only through the plate 24 and the web 42 fits snugly in the apertures 30 of plate 25 and against the top of the insulating sleeve 41. The auxiliary web 43 fits inside of the insulating sleeve 41 and transmits strain through this insulating member to the shoulders or flanges 4 and 5. Bolt 22 with insulation carried thereby, is identical with that shown in Figure 17.

When the reinforcing plate 25 is desired and the plate 24 is not desired, the parts are arranged as shown in Figure 12. By the removal of the plate 24 and the tightening of the nut 39, the lower part of the web 42 will press downwardly on the insulating sleeve 41 and crush the same at the lower part somewhat as indicated in Figures 12 and 15. The upper part of the insulating sleeve 41 cannot be crushed as it is guided in the notches 8 to 11 inclusive and also by the auxiliary flange 42 which transmits power through the insulating sleeve to the flanges 4 and 5. In this form of the invention, the insulating sleeve 41 and the insulating ring 38 merely act as liners or washers for taking up loose motion. These members are preferably used as they are of the right size and convenient, though if desired, metal members could be substituted without departing from the spirit of the invention. When the reinforcing plate 25 is not desired, the same is merely removed and the parts re-assembled as shown in Figure 13. In this arrangement, the insulating sleeve 41 is eliminated though the ring 38 is retained. The auxiliary flange 43 merely extends loosely down into the groove 3 while the web 42 snugly fits the respective notches 8 to 11 inclusive. It will be noted that the clip 40 may be used with or without insulation and with or without the plate 25. This clip, acting through the two bolts 22 as shown in Figure 5, will clamp the rail 23 in place and also the plates 24 and 25 when the same are used. This arrangement permits ready substitution of the parts and application and removal of any part or the entire tie, as for instance when a replacement is desired. The parts may be removed without disturbing the rail 23, though ordinarily, this rail is preferably raised a few inches in order to pull out the tie body when a new one is to be placed in position.

What we claim is:

1. A metal railroad tie and fastener therefor comprising a tie body formed with a longitudinally positioned groove and facing flanges overhanging said groove, each of said flanges having a group of notches near each end of the body, an insulating plate mounted on said tie body adjacent each end, said plate having notches registering with certain of the notches in the tie body, a reinforcing plate positioned on top of the insulating plate, said reinforcing plate having notches registering with the notches on the insulating plate, a pair of clips mounted on said reinforcing plate and provided with an overhanging portion pressing against the base of a rail, and a depending flange or web extending through certain of the notches in said reinforcing plate and insulating plate, a bolt extending through said clip for clamping the clip in place, means surrounding the lower part of the bolt for insulating the same from the tie body, and a tubular sleeve extending through the notches in said insulating plate and the notches in said tie body, said sleeves surrounding the depending web and said clip for insulating the same from the tie body.

2. A rail tie and fastener comprising a tie body having overhanging notched flanges, a clip having a depending web fitting into certain of said notches, said clip having a portion positioned to overlap part of the base of a rail, a bolt extending through the clip and positioned in respect to the clip and the rail so that the head of the bolt will underlap somewhat said base, and means surrounding the web of said clip and the shank of said bolt for causing these members to tightly fit in their respective positions.

3. A metal tie and rail fastener comprising a tie body having laterally extending notches therein, a reinforcing plate mounted on the tie body, said plate being formed with notches registering with the first mentioned notches and with a longitudinal notch, said tie body being provided with a groove having overhanging shoulders, said groove registering with the longitudinal notch in said plate, a bolt positioned with its head engaging the under surface of said shoulders and extending through said groove and longitudinal notch in said plate, and a clip having an aperture for accommodating said bolt, an overhanging extension fitting against the upper surface of the base of a rail resting on said plate, and a depending web extending through the notches in said plate and through certain of the notches in said tie body, said bolt having a nut which when tightened will cause the clip to clamp the reinforcing plate against the tie body and also clamp the rail on the reinforcing plate.

4. A rail tie and fastener comprising a tie body having shoulders forming part of the upper surface, an insulating plate loosely mounted on said body over said shoulders, said insulating plate being formed with a longitudinally extending notch at each end and laterally extending notches extending from each of said longitudinal notches, a reinforcing plate loosely positioned on top of said insulating plate, said reinforcing plate being formed with notches identical in shape with the notches in said insulating plate and in line therewith when the reinforcing plate is in operative position on the insulating plate, means co-acting with said shoulders for clamping both of said plates in position, and a rail on top of said reinforcing plate and insulating means for insulating said clamping means from said body.

5. A rail tie and fastener comprising a tie body having shoulders forming part of the upper surface, an insulating plate loosely mounted on said body over said shoulders, said insulating plate being formed with a longitudinally extending notch at each end and laterally extending notches extending from each of said longitudinal notches, a reinforcing plate loosely positioned on top of said insulating plate, said reinforcing plate being formed with notches identical in shape with the notches in said insulating plate and in line therewith when the reinforcing plate is in operative position on the insulating plate, means co-acting with said shoulders for clamping both of said plates in position, and a rail on top of said reinforcing plate, said means including a clip mounted wholly on said reinforcing plate with a portion fitting against the upper surface of said rail, and insulating means for insulating said clamping means from said body.

6. A rail tie and fastener comprising a body having notched shoulders forming part of its upper surface, a notched reinforcing plate mounted on said body so that the notches therein will register with the notches in said shoulders, and clamping means acting to clamp said plate on said body, and a rail on said plate, said clamping means including a clip mounted wholly on said plate with a portion extending through the notches in said plate and the notches in said shoulders.

7. A rail tie and fastener comprising a body having notched shoulders forming part of its upper surface, a notched reinforcing plate loosely mounted on said body and positioned so that the notches in the plate will register with the notches in said shoulders, and clamping means co-acting with said shoulders for clamping said plate on said body and a rail on said plate, said clamping means including a clip mounted on said plate with a portion extending through the notches in said plate and the notches in said shoulders, and a portion extending over said rail.

8. A rail tie and fastener comprising a body having notched shoulders forming part of its upper surface, a notched reinforcing plate loosely mounted on said body and positioned so that the notches in the plate will register with the notches in said shoulders, and clamping means co-acting with said shoulders for clamping said plate on said body and a rail on said plate, said clamping means including a bolt with its head interlocking with said shoulders, and an apertured clip positioned so that the bolt will extend through the apertures therein, said clip being mounted wholly on said plate with a portion extending through the notches in said plate and the notches in said shoulders, and a portion extending over said rail.

9. A rail tie and fastener comprising a body having notched shoulders forming part of its upper surface, a notched insulating plate loosely mounted on said body and positioned so that the notches therein will register with the notches in said shoulders, a notched reinforcing plate loosely mounted on said insulating plate and positioned so that the notches in the reinforcing plate will register with the notches in the insulating plate, and clamping means acting to clamp a rail on said reinforcing plate and said plates together and against said body, said clamping means including a clip mounted wholly on said reinforcing plate with a portion extending through the notches in said reinforcing plate, said insulating plate and in said shoulders, and a second portion extending over said rail.

10. A rail tie and fastener structure comprising a tie body, a loosely mounted reinforcing plate, clamping means including a clip mounted wholly on said plate for clamping said plate on said body and a rail on said plate, and insulating means for insulating said plate and clamping means from said body, said insulating means, said reinforcing plate and said clamping means being formed so that the clamping means will function properly with the insulating means and the reinforcing plate, with the reinforcing plate without the insulating means and without the insulating means and the reinforcing plate.

11. A rail tie and fastener comprising a body having notched shoulders forming part of its upper surface, a notched insulating plate loosely positioned on said body so that the notches therein will register with the notches in said shoulders, a reinforcing notched metallic plate mounted loosely on said insulating plate with the notches therein registering with the notches in said metallic plate, clamping means acting to clamp both of said plates on said body and a rail on said metallic plate, said clamping means including a clip positioned wholly on said metallic plate with a portion extending through the notches in said metallic plate, said insulating plate and said shoulders, and insulating means for insulating said clamping means from said body, said notched shoulders, said metallic plate, said insulating plate and said clip being so formed that the clip will function properly with the metallic plate and the insulating plate with the metallic plate without the insulating plate and without both the metallic plate and the insulating plate.

12. In a rail tie and fastener a clip having an apertured body formed with a web depending from the bottom of the body adjacent one end thereof, and an auxiliary web depending from the first web, said auxiliary web being of less length and less width than the first web.

13. In a rail tie and fastener a clip formed with a body having a bolt receiving aperture and at one end an overhanging member for clamping a rail, an apron at the opposite end and a depending web, and an auxiliary web depending from the bottom of said first mentioned web, said auxiliary web being of less length and less width than the first mentioned web.

14. A rail tie and fastener comprising a tie body having notched shoulders forming part of its upper surface, a notched insulating plate loosely positioned on said body with the notches in the plate positioned to register with the notches in said shoulders, a notched reinforcing metallic plate loosely positioned on said insulating plate, the notches in said metallic plate being positioned to register with the notches in said insulating plate, a bolt positioned with its head interlocking with said shoulders, said bolt extending through certain of the notches in said insulating plate and said metallic plate, insulating means for insulating said bolt from said tie body, an insulating sleeve positioned to extend through the notches in said insulating plate and the notches in said shoulders, and an apertured clip positioned on said metallic plate and clamped in position by said bolt, said clip having a main web snugly fitting into the apertures in said metallic plate and an auxiliary web depending from said main web, said auxiliary web fitting snugly in said insulating sleeve and extending through said shoulders.

15. A rail tie and fastener comprising a tie body having notched shoulders forming part of its upper surface, a notched insulating plate loosely mounted on said body with the notches positioned to register with the notches in said shoulders, a notched metallic reinforcing plate positioned loosely on said insulating plate, the notches in said metallic plate registering with the notches in said insulating plate, all of said notches being of the same size and shape, and insulated clamping means for clamping a rail on said metallic plate and said plates together and to said body, said clamping means including a clip mounted on said metallic plate and an insulating sleeve, said clip being formed with a main depending web and an auxiliary web depending from the bottom of said main web, said main web being positioned in the notches in said metallic plate and the auxiliary web being positioned in said insulating sleeve and extending through the notches in said insulating plate and said shoulders, said clip being capable of functioning when said insulating plate is removed and when both said insulating plate and said metallic plate are removed as the main web is of a size to snugly fit into any of said notches.

16. In a metallic fastener for rail ties, a clip formed with a body having at one end a depending web extending at substantially right angles to the body, an auxiliary web depending from the bottom of said first mentioned web, said auxiliary web being of less length and less width than the first mentioned web, an apron at the end of the body carrying the web, said apron presenting an elongation of the body, said body being formed with an aperture extending therethrough, and an overhanging clamping flange at the end opposite said apron, said flange being spaced from the bottom surface of the body.

17. A rail tie and fastener, comprising a body having notched shoulders forming part of its upper surface, a notched reinforcing plate loosely mounted on said body and positioned so that the notches in the plate will register with the notches in said shoulders, and clamping means co-acting with said shoulders for clamping said plate on said body and a rail on said plate, said clamping means including a clip mounted on said plate with a portion extending through the notches in said plate and the notches in said shoulders, and a portion extending over said rail, an insulating plate positioned between said reinforcing plate and the tie, insulating means for said clamping means, said insulating means including an insulating structure for holding the portion of said clip which extends through the notches in said reinforcing plate out of contact with said tie.

JOHN G. SNYDER.
ARTHUR N. SNYDER.